United States Patent Office 3,480,413
Patented Nov. 25, 1969

3,480,413
GASOLINE CONTAINING 2,6-DI-TERT-BUTYL-4-HALOPHENOL
Larry Plonsker, Baton Rouge, La., assignor to Ethyl Corporation, New York, N.Y., a corporation of Virginia
No Drawing. Filed May 25, 1966, Ser. No. 552,724
Int. Cl. C10l 1/30
U.S. Cl. 44—69                                           5 Claims

ABSTRACT OF THE DISCLOSURE

The exhaust hydrocarbon emission and combustion chamber deposit formation of an internal combustion engine is decreased by use of a liquid hydrocarbon fuel containing a halogenated phenol such as 2,6-di-tert-butyl-4-chlorophenol.

---

This invention relates to a fuel composition for use in internal combustion engines which results in reduced hydrocarbon emission in the exhaust gas and a reduced amount of combustion chamber deposits. In particular, this invention relates to a liquid hydrocarbon fuel containing a halophenol.

The exhaust gas of internal combustion engines contains some quantity of unburned hydrocarbons. Hydrocarbons are reported by researchers to react with ozone in the atmosphere, forming irritants. Research has attributed photochemical smog to the presence of hydrocarbons in the atmosphere. Thus, a need exists for a method to reduce the amount of hydrocarbon introduced into the atmosphere from the exhaust gas of internal combustion engines. Previous means of accomplishing this have been through the secondary oxidation of the unburned exhaust hydrocarbons employing catalytic oxidizing methods or direct flame oxidation in the exhaust system. If the amount of unburned hydrocarbons initially in the exhaust can be reduced, the need for secondary oxidation is diminished. Previous attempts to reduce the initial hydrocarbon content of the exhaust gas have concentrated on mechanical methods such as improved carburetion. The present invention relates to a method of reducing exhaust emission through the use of a fuel containing an exhaust emission reducing additive.

An object of this invention is to provide an improved fuel composition. A further object is to provide a fuel composition which, when used to operate an internal combustion engine, results in reduced hydrocarbon emission. A still further object is to provide a fuel that will substantially reduce the amount of deposits formed in the combustion chamber of engines.

These and other objects are accomplished by providing an improved fuel composition comprising a major portion of a liquid hydrocarbon fuel and an emission reducing quantity of a compound having the formula

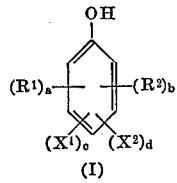

(I)

wherein $R^1$ and $R^2$ are independently selected from the group consisting of alkyl radicals containing from 1–20 carbon atoms and aralkyl radicals containing from 7–20 carbon atoms, $X^1$ and $X^2$ are halogens independently selected from the group consisting of chlorine and bromine, $a$ and $b$ are integers from 0 to 1, and $c$ and $d$ are integers from 0 to 1, such that the sum of $c$ and $d$ is at least one. The solubility of the compound must be high enough that a small emission reducing quantity can be dissolved in the fuel. Thus, examples of suitable emission reducing compounds are 2-tert-butyl-4-methyl-6-chlorophenol; 2,4-dichlorophenol; 2,4-di-methyl-6-bromophenol; p-chlorophenol; p-bromophenol; 3-methyl-4,6-di-chlorophenol; 2,4,6-tri-chlorophenol; 3 - methyl-4-bromo-6-tert-butylphenol; 2,4-di-chloro-6-tert-butylphenol; 2,6-di(2 - ethylhexyl)-4-chlorophenol; 2,6-di-bromo-4-eicosylphenol; 3-lauryl-4-chlorophenol; 2,6-di-methyl - 4 - chlorophenol; 2-chloro-3,5-di-ethylphenol; 2 - isopropyl - 4 - bromophenol; 2-chloro-4-amyl - 6 - bromophenol and 2 (α-methylbenzyl)-4,6-dichlorophenol.

In a preferred embodiment of the invention the exhaust emission reducing compound of Formula I is such that at least one of $a$ and $b$ is equal to one, and in a more preferred embodiment, both $a$ and $b$ are equal to one, and at least one of $R^1$ and $R^2$ is located in a position ortho to the hydroxyl group. Some examples of these compounds are 2,6 - di - cyclohexyl - 4 - chlorophenol; 2,6 - di - iso-octyl - 4 - bromophenol; 2(α-methylbenzyl)-4-chlorophenol; 2,6-di-(α-methyldibenzyl)-4-bromophenol; 2,6-di-sec-butyl-4-chlorophenol and 2-tert-butyl-4-chlorophenol.

In an especially preferred embodiment, both $R^1$ and $R^2$ are alpha-branched alkyl or aralkyl radicals located ortho to the hydroxyl group. Examples of these compounds are 2,6-di-tert-amyl-4-chlorophenol; 2-tert-butyl-4-bromo-6-(α - methylbenzyl)phenol; 2-isopropyl - 4 - chloro - 6 - tert - butylphenol; 2,6 - di - tert - octyl - 4 - chlorophenol and 2,6-di-tert-decyl-4-chlorophenol. Most preferred embodiments of this invention are fuels comprising a major portion of a liquid hydrocarbon and an exhaust emission reducing quantity of 2,6-di-tert-butyl-4-chlorophenol or 2,6-di-tert-butyl-4-bromophenol.

The additive compounds of this invention can be prepared by methods well known in the art. For example, they can be prepared by reacting the desired alkyl or aralkyl phenol, or mixture of phenols, with chlorine or bromine. Conversely, they can be prepared by reacting the desired chloro- or bromo-phenol with an alkylating or aralkylating agent such as isobutylene, diisobutylene, propylene, styrene, α-methylstyrene, and the like. This reaction is readily catalyzed by acids such as sulfuric, phosphoric or p-toluene sulfonic acids.

The especially preferred 2,6-di-alpha-branched alkyl or aralkyl halophenols are easily prepared by chlorinating or brominating the 2,6-di-alpha-branched alkyl or aralkyl phenol. These starting phenols can be prepared by the method described by Ecke et al. in U.S. 2,831,898.

The most preferred 2,6-di-tert-butyl-4-chlorophenol or 2,6-di-tert-butyl-4-bromophenol additive can be prepared by reacting 2,6-di-tert-butylphenol with chlorine or bromine, generally in an inert solvent such as an aliphatic hydrocarbon. The 2,6-di-tert-butylphenol is a commercial product sold by the Ethyl Corporation.

The additives of this invention can be used to reduce emission in a broad range of liquid hydrocarbon fuels including both spark ignition and diesel fuels. It is especially useful in gasoline used in spark ignition engines. These liquid hydrocarbon fuels have a boiling range of from about 95 to about 400° F., and contain aliphatic, aromatic, olefinic and naphthenic hydrocarbons. The hydrocarbon fuels may contain other materials frequently used in such fuels. For example, the fuels may contain antiknock agents such as tetraethyllead, tetramethyllead, triethylmethyllead, diethyldimethyllead, trimethylethyllead, tetravinyllead, triethylvinyllead, diethyldivinyllead, trivinylethyllead, ferrocene, methyl ferrocene, iron carbonyl, methylcyclopentadienyl manganese tricarbonyl, methylcyclopentadienyl nickel nitrosyl, N,N-dimethylaniline, and the like. When metallic antiknock agents are employed the fuels generally contain a scavenging agent. A particularly useful scavenging agent when lead alkyls are employed are the halohydrocarbons such as ethylenedichloride, ethylenedibromide, and the like. An especially useful fuel in this invention is a fuel containing from 0.5 to 6 grams of lead per gallon as tetraethyllead and from 1.5 to 2.5 gram atoms of chlorine as a chlorohydrocarbon per gram atom of lead and from 0.5 to 1.5 gram atoms of bromine as a bromohydrocarbon per gram atom of lead. The most preferred chlorohydrocarbon is ethylenedichloride, and the most preferred bromohydrocarbon is ethylenedibromide.

The fuels can also contain deposit modifying agents such as phosphorus containing additives, for example, tricresylphosphate, cresyldiphenylphosphate, trimethyl phosphate, dimethylcresylphosphate, tris($\beta$-chloropropyl) phosphate, and the like.

The fuels frequently contain antioxidant additives such as 2,6 - di - tert - butylphenol; 2,6 - di - tert - butyl - 4 - methylphenol, 4,4' - methylenebis(2,6 - di - tert - butylphenol); 2,2' - methylenebis(4 - methyl - 6 - tert - butylphenol), phenylenediamines; p-nonylphenol; mixed alkylated phenols, 4,4' - thiobis(3 - methyl - 6 - tert - butylphenol), and the like.

Other materials can be present in the fuel such as deicers, metal deactivators, pour point depressants, boron esters, nickel alkyl phosphates, and dyes.

The following examples illustrate the preparation of typical improved fuel compositions of this invention.

EXAMPLE 1

To a blending vessel is added 1000 gallons of a gasoline having the following properties:

| | |
|---|---|
| Boiling range ° F | 101-375 |
| Research octane number | 93 |
| Aromatics (volume percent) | 38 |
| Olefinics (volume percent) | 10 |
| Aliphatics (volume percent) | 52 |

To this gasoline is added a tetraethyllead antiknock agent containing two gram atoms of chlorine as ethylenedichloride per gram atom of lead and one gram atom of bromine as ethylenedibromide per gram atom of lead. The quantity of tetraethyllead antiknock agent added is sufficient to provide 3.17 grams of lead per gallon of fuel. There is then added sufficient 2,6-di-tert-butyl-4-chlorophenol to give a concentration of 0.25 weight percent. The mixture is agitated until thoroughly mixed, resulting in a gasoline having reduced exhaust emission properties.

EXAMPLE 2

To a blending vessel is added 1000 gallons of a gasoline having the following properties:

| | |
|---|---|
| Boiling range ° F | 94-403 |
| Research octane number | 97 |
| Aromatics (volume percent) | 62 |
| Olefinics (volume percent) | 5 |
| Aliphatics (volume percent) | 33 |

To this gasoline is added a tetraethyllead antiknock mixture containing one theory of chlorine as ethylenedichloride and 0.5 theory of bromine as ethylenedibromide. A quantity sufficient to provide 2.12 grams of lead per gallon is added. There is also added, as an antioxidant, a mixture of butylated phenols containing about 75 percent 2,6-di-tert-butylphenol, such that the gasoline contains 0.1 weight percent of the antioxidant mixture. Then 0.15 weight percent of 2,6-di-tert-butyl-4-bromophenol is added and the mixture thoroughly stirred, resulting in a gasoline giving reduced emission and combustion chamber deposit weight when used to operate a spark ignition internal combustion engine.

EXAMPLE 3

To a blending vessel is added 1000 gallons of a diesel fuel having a boiling range of from 430-572° F., and a cetane number of 47. To this is added 0.3 weight percent amyl nitrate as a cetane improver. There is then added 0.2 weight percent of 2-tert-butyl-4,6-di-chlorophenol, resulting in a diesel fuel having reduced exhaust emission properties.

In any of the previous examples, the aforementioned emission reducing compounds can be employed, giving fuels having reduced emission properties. Also, the concentrations may be varied from those shown. In general, a concentration of from about 0.05 to 3 weight percent of the emission reducing additive can be employed. A preferred concentration range is from about 0.1 to 1 weight percent, and a most useful range is from about 0.1 to 0.5 weight percent.

Tests have been conducted to demonstrate the useful exhaust emission properties of the present compounds. In these tests, a single cylinder overhead valve engine, having a 10:1 compression ratio and a 36 cubic inch displacement, is operated on a typical commercial gasoline containing 3.17 grams of lead as a commercial tetraethyllead antiknock mixture containing one theory of chlorine as ethylenedichloride and 0.5 theory of bromine as ethylenedibromide. One theory of either bromine or chlorine is two gram atoms of bromine or chlorine per gram atom of lead. The engine is idled for 45 seconds and then run at 50 percent wide open throttle for 135 seconds under the following conditions.

| | |
|---|---|
| Air/fuel ratio | 13 |
| R.p.m. | 1370 |
| Ignition timing ° BTC | 15 |

The above cycle is continuously repeated until both deposits and hydrocarbon emissions have stabilized. This usually requires from about 100–145 hours of operation. The hydrocarbon content of the exhaust gas is determined using a Beckman 109–A Flame Isomerization Detector, and the deposits are determined by disassembling the engine, removing and weighing the deposits. The procedure is first carried out using a fuel without the emission reducing additive and then repeated on the same fuel containing an emission reducing additive. This is followed by another test on the fuel, again without the emission additive, to reconfirm the baseline. Using this procedure, the following results in terms of the percent reduction in exhaust hydrocarbon emission and engine deposits were obtained using emission reducing additives of this invention.

| Additive | Conc. | Percent reduction | |
|---|---|---|---|
| | | Emission | Deposits |
| 2,6-di-tert-butyl-4-chlorophenol | 0.25 | 29 | 19 |
| Do | 0.1 | 18 | 9 |
| 2,6-di-tert-butyl-4-bromophenol | 0.25 | 7 | 39 |

As these results show, the emission reducing additives of the present invention effectively reduce both exhaust emission and engine deposits.

I claim:

1. A fuel composition especially adapted to reduce hydrocarbon exhaust emission and combustion chamber deposits when used to operate a spark ignited internal combustion engine, said fuel composition comprising a major amount of gasoline and a minor amount, sufficient to reduce the combustion chamber deposits and hydrocarbon content of the exhaust gas, of a compound selected from the group consisting of 2,6 - di - tert - butyl - 4 - chlorophenol and 2,6-di-tert-butyl-4-bromophenol.

2. The fuel composition of claim 1 wherein said compound is 2,6-di-tert-butyl-4-chlorophenol.

3. The fuel composition of claim 2 wherein said liquid hydrocarbon fuel is a hydrocarbon of the gasoline boiling range containing from 0.5 to 6 grams of lead per gallon as a lead alkyl antiknock and from 1.5 to 2.5 gram atoms of chlorine as ethylene dichloride per gram atom of lead and from 0.5 to 1.5 gram atoms of bromine as ethylene dibromide per gram atom of lead.

4. The fuel composition of claim 1 wherein said compound is 2,6-di-tert-butyl-4-bromophenol.

5. The fuel composition of claim 4 wherein said liquid hydrocarbon fuel is a hydrocarbon of the gasoline boiling range containing from 0.5 to 6 grams of lead per gallon as a lead alkyl antiknock and from 1.5 to 2.5 gram atoms of chlorine as ethylene dichloride per gram atom of lead and from 0.5 to 1.5 gram atoms of bromine as ethylene dibromide per gram atom of lead.

References Cited

UNITED STATES PATENTS

| | | | |
|---|---|---|---|
| 2,068,635 | 1/1937 | Prutton | 44—78 |
| 2,281,598 | 5/1942 | Prutton | 44—79 |
| 2,890,946 | 6/1959 | Anderson et al. | 44—79 |
| 3,075,832 | 1/1963 | Ecke et al. | 44—78 |
| 3,290,250 | 12/1966 | Orloff et al. | 44—78 |

DANIEL E. WYMAN, Primary Examiner

Y. H. SMITH, Assistant Examiner

U.S. Cl. X.R.

44—78